O. T. JONES.
STALK PULLER AND GRINDER.
APPLICATION FILED DEC. 23, 1919.
1,379,571.
Patented May 24, 1921.
3 SHEETS—SHEET 1.
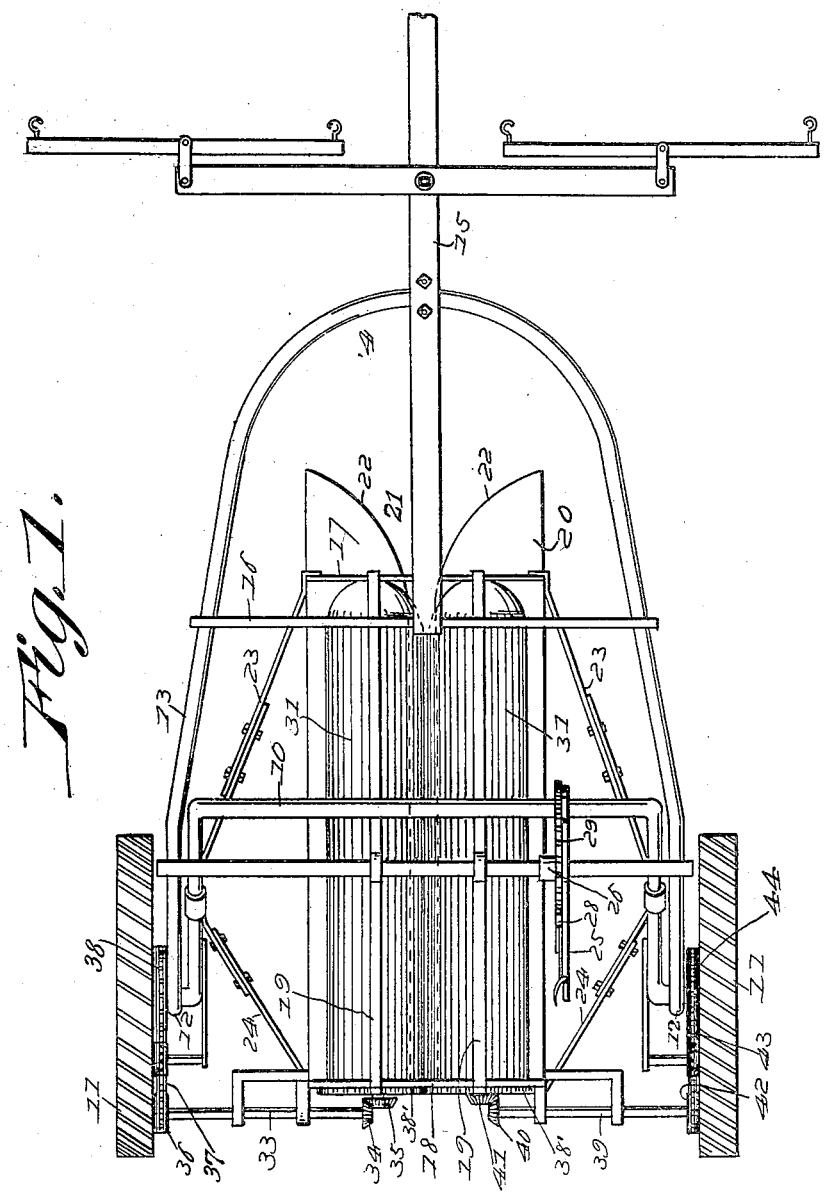

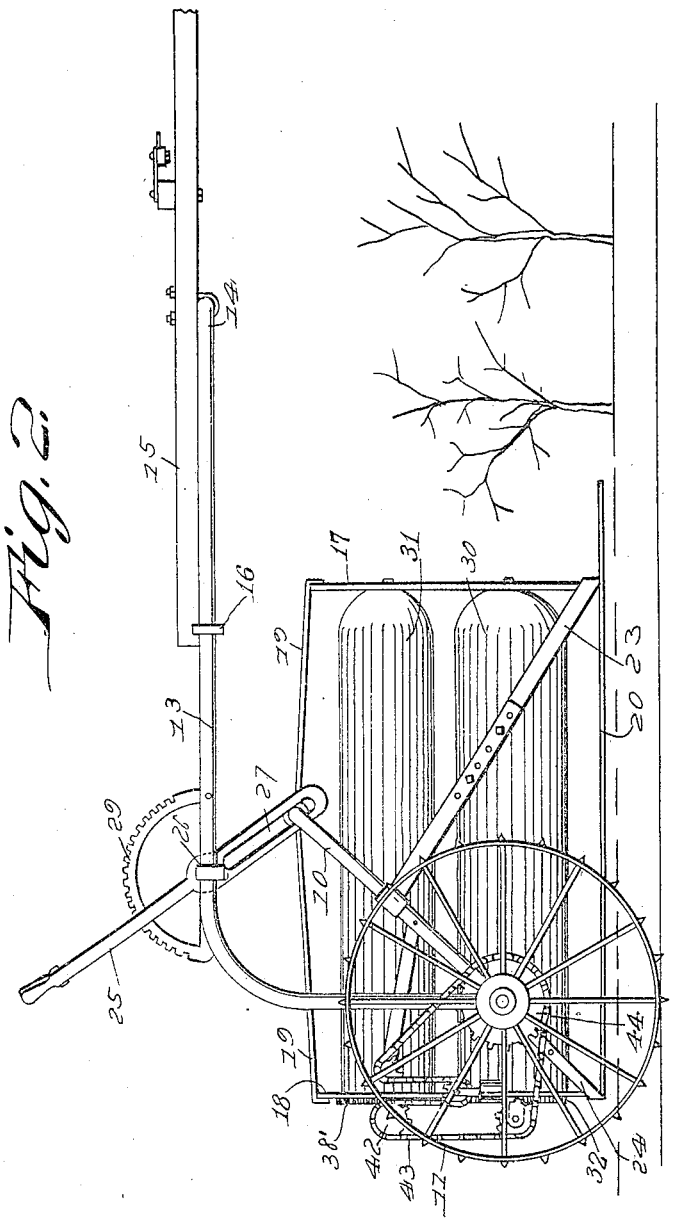

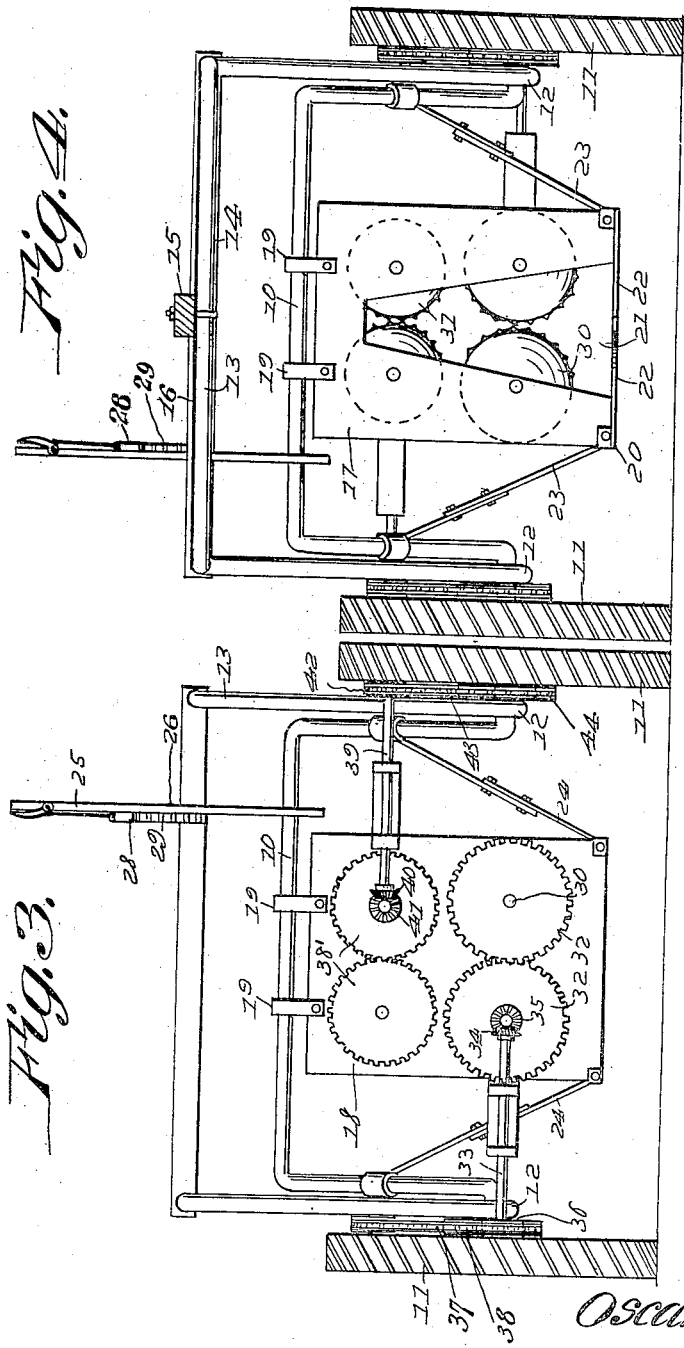

UNITED STATES PATENT OFFICE.

OSCAR T. JONES, OF SILVER CITY, MISSISSIPPI.

STALK PULLER AND GRINDER.

1,379,571. Specification of Letters Patent. Patented May 24, 1921.

Application filed December 23, 1919. Serial No. 346,876.

*To all whom it may concern:*

Be it known that I, OSCAR T. JONES, citizen of the United States of America, residing at Silver City, in the county of Humphrey and State of Mississippi, have invented new and useful Improvements in Stalk Pullers and Grinders, of which the following is a specification.

The object of the invention is to provide an agricultural machine adapted for progressively uprooting stalks as of cotton plants, corn and the like, and macerating or reducing the same to a fragmentary condition to the end that the vegetable material thus reduced may be plowed under, not only as a means of disposing of it without removal from the field, but as a fertilizer for the subsequent crop for the next season's planting, and to this end the invention consists in a construction and combination of parts of which a preferred embodiment is shown in the accompanying drawings, it being understood that changes in form and proportions may be resorted to within the scope of the claims without departing from the principles involved.

In the drawing:

Figure 1 is a plan view of the machine.

Fig. 2 is a side view of the same.

Fig. 3 is a rear view and Fig 4 is a front view.

In the illustrated form of the machine an arched axle 10 is provided for the ground wheels 11, and connected by means of eyes 12 with the spindle portions of said axle are the rear ends of the side arms 13 of a yoke frame 14 with which is connected the draft tongue 15 or equivalent means for utilizing either horse or tractor power for advancing the machine, the rear end of the tongue being supported by a transverse brace bar 16.

Connected with and supported by the arch of the axle 10 is a frame having front and rear plates 17 and 18 connected by suitable longitudinal bars 19 and carrying the guide plates 20 which are spaced apart at their adjacent edges to form a throat 21 to receive the stalks of the plants at a point near the surface of the soil, the front end of the throat being widened by outwardly curving the inner edges of said plates to provide guides 22 to insure the engagement of the machine with the plant stalks.

Extending upward from the lower front and rear corners of the frame to the arched axle are the brace bars 23 and 24 to the end that said frame is supported by the axle, and the adjustment of the latter is designed to vary the position of the frame, to which end a hand lever 25 is fulcrumed as at 26 and is provided with a slot 27 for engaging the arch of the axle. The lever may be locked in an adjusted position to correspondingly secure the frame by means of a pawl 28 operating in connection with a segmental rack 29.

Mounted in said movable frame are the lower and upper pairs of pulling rolls or drums 30 and 31, the members of each pair being arranged side by side and in coöperative relation to engage the stalks in the guide throat 21 and draw said stalks upward so as to bodily uproot the same from the soil, and preferably these rolls or drums are provided with corrugated surfaces which operate sufficiently close together to cause a crushing and grinding and hence maceration or reduction of the stalks as they are carried upward by the rolls, to the end that the material is deposited upon the ground in rear of the machine in such a condition as readily to be plowed under when preparing the soil for a subsequent crop.

Motion is communicated to the upper and lower sets or pairs of drums or rolls independently of each other, the members of the lower set 30 being connected for simultaneous operation in opposite directions by means of terminal intermeshing gears 32, and motion being communicated to one of them by means of a shaft 33 having a beveled gear 34 meshing with a beveled gear 35 on the spindle of the drum, said shaft receiving motion from one of the ground wheels 11 through a sprocket wheel 36 traversed by a chain 37 passing around a sprocket wheel 38 on said shaft. The drums or rollers of the other pair or set are connected for simultaneous operation in opposite directions by intermeshing gears 38', and one of them receiving motion from the other ground wheel 11 by means of a shaft 39 having a beveled pinion 40 meshing with a similar pinion 41 on the spindle of the roll, and also having a sprocket wheel 42 traversed by a sprocket chain 43 which extends around a sprocket wheel 44 actuated by said ground wheel.

In operation, as will be understood, the machine is guided to cause the plant stalks to be received by the guide throat where the tops are engaged by the drums or rollers and run vertically upward, the grinding or reducing of the stalks progresssing as the plant is uprooted to the end that the material is discharged at the top of the upper set of rollers and is adapted to find its way rearwardly thereover for discharge at the rear ends thereof, and to facilitate this rearward feeding movement of the material the frame in which they are mounted may be tilted upward at its front end by the adjustment of the hand lever 25, although under ordinary circumstances the mechanism will operate satisfactorily with the rolls or drums in the horizontal position indicated in Fig. 2.

What is claimed is:

1. A machine for the purpose described having pairs of coöperating crushing rolls disposed axially in planes parallel with the direction of progress of the machine, means for guiding plant stalks to the operative faces of said rolls, and means for rotating the rolls of each pair in opposite directions to cause an upward movement of their contiguous faces.

2. A machine for the purpose described having lower and upper pairs of rolls having corrugated surfaces, the members of each pair being arranged with their surfaces in tangential and contiguous relation and with their axes in planes parallel with the direction of progress of the machine, means for guiding plant stalks to the operative faces of said rolls, operating devices for driving the members of each pair of rolls in opposite directions to cause upward movement of their contiguous faces, and means for varying the axial position of the rolls in planes parallel with the direction of movement.

3. A machine for the purpose described having a wheel supported frame, a roll supporting frame movably mounted in the wheel supported frame and provided with lower and upper pairs of coöperating rolls disposed axially in planes parallel with the direction of progress of the machine, said rolls having corrugated faces arranged in coöperative relation, a guide throat disposed parallel with and below the plane of the lower set of rolls and having a widened front end for guiding stalks thereinto, means for angularly adjusting said roll supporting frame to vary the axial positions of the rolls in planes parallel with the direction of progress of the machine, and operating connections respectively between the lower and upper sets of rolls and the wheels of the wheel supported frame.

4. A machine for the purpose described having an arched axle and ground wheels mounted thereon, a draft frame having a yoke of which the side bars are mounted at their rear ends upon the spindle portions of said axle, a frame carried by the arch of the axle and provided adjacent to the surface of the ground with a longitudinal guide throat provided with a rearwardly contracted front end, operating means connected with the arch of said axle for varying the angular position of said axle supported frame, upper and lower pairs of rolls arranged above the plane of said guide throat with their axes in planes parallel with the direction of progress of the machine and having corrugated faces, the faces of the members of each pair of rolls being arranged in coöperative crushing relation, and means for communicating motion respectively from said ground wheels to the pairs of rolls.

In testimony whereof I affix my signature.

OSCAR T. JONES.